United States Patent
Lautenschläger et al.

(10) Patent No.: US 7,176,443 B2
(45) Date of Patent: Feb. 13, 2007

(54) OPTOELECTRONIC SENSOR AND PROCESS FOR DETECTION OF AN OBJECT IN A MONITORED AREA

(75) Inventors: Holger Lautenschläger, Eriskirch (DE); Jaromir Palata, Langenargen (DE); Martin Buck, Wasserburg (DE); Hartmut Bielefeldt, Frickingen (DE); Rolf Fensterle, Kehlen (DE)

(73) Assignee: IFM Electronic GmbH, Essen (DE)

(*) Notice: Subject to any disclaimer, the term of this patent is extended or adjusted under 35 U.S.C. 154(b) by 135 days.

(21) Appl. No.: 10/958,189

(22) Filed: Oct. 5, 2004

(65) Prior Publication Data
US 2005/0116149 A1    Jun. 2, 2005

(30) Foreign Application Priority Data
Oct. 6, 2003    (DE) ................. 103 46 813

(51) Int. Cl.
G08B 13/18    (2006.01)
G01C 3/00    (2006.01)
G01C 3/08    (2006.01)

(52) U.S. Cl. ..................... 250/221; 340/555

(58) Field of Classification Search ........... 250/221, 250/222.1, 239; 356/213, 218, 219, 226, 356/1, 3.01, 3.05, 3.06, 4, 5.01, 28; 340/555, 340/556, 557
See application file for complete search history.

(56) References Cited

U.S. PATENT DOCUMENTS

| | | | | |
|---|---|---|---|---|
| 4,459,086 A * | 7/1984 | Hafele et al. | ............... | 417/296 |
| 4,734,587 A * | 3/1988 | Schwarte | ............... | 250/559.38 |
| 4,782,224 A | 11/1988 | Haas et al. | | |
| 6,441,937 B1 * | 8/2002 | Baur et al. | ................. | 398/135 |
| 2004/0085480 A1 * | 5/2004 | Salzer et al. | ................ | 348/584 |

FOREIGN PATENT DOCUMENTS

| | | |
|---|---|---|
| DE | 42 38 116 | 6/1994 |
| DE | 43 11 691 | 10/1994 |
| DE | 199 33 439 | 2/2000 |

\* cited by examiner

*Primary Examiner*—Georgia Epps
*Assistant Examiner*—Don Williams
(74) *Attorney, Agent, or Firm*—David S. Safran

(57) ABSTRACT

An optoelectronic sensor, especially a reflection photoelectric barrier and a reflection light sensing device, for detection of an object (2) in a monitored area, with a housing (3) with transmitting and receiving optics (6) and with an evaluation circuit (10). The optoelectronic sensor has an especially simple structure in that there is only one single optoelectronic transmitting and receiving component (14) which sequentially acts as both the opto-transmitter and the opto-receiver in succession in time.

25 Claims, 3 Drawing Sheets

OPTOELECTRONIC SENSOR AND PROCESS FOR DETECTION OF AN OBJECT IN A MONITORED AREA

BACKGROUND OF THE INVENTION

1. Field of the Invention

The invention relates to an optoelectronic sensor, especially a reflection photoelectric barrier or a reflection light sensing device, for detection of an object in a monitored area, with a housing, with transmitting and receiving optics and with an evaluation circuit. In addition, the invention relates to a process for detection of an object in a monitored area, with an optoelectronic sensor, an electrical transmitted signal being converted into an optical transmitted signal, the optical transmitted signal being emitted into the monitored area, reflected back as the optical received signal at least in part to the optoelectronic sensor by a reflector or an object, and being converted into an electrical received signal.

2. Description of Related Art

Known optoelectronic sensors always have an opto-transmitter and at least one opto-receiver. Here, the transmitting components, therefore the light-emitting components, are typically diodes, preferably laser diodes, and the receiving components are generally photodiodes. Optoelectronic sensors can be divided essentially into three different types, specifically one-way systems, reflection systems and sensor systems.

One-way systems consist, on the one hand, of a transmitter device, and on the other hand, of a receiver device which is separated from it in space. The transmitter device and the receiver device are located opposite one another on the lateral boundaries of an area which is to be monitored so that the light emitted by the transmitter device can be received by the receiver device. The disadvantage here is that two electronic devices must be required, mounted and supplied with electrical energy. In contrast, in reflection systems, which are also called reflection photoelectric barriers, transmitters and receivers are integrated in a single unit, therefore in a single device.

Such a unit, which constitutes a transmitter/receiver device, is located on the outer boundary of the area which is to be monitored, while on the other boundary of the area which is to be monitored, which latter boundary is opposite the former boundary, a reflector, for example, a triple mirror, is provided which reflects the light emitted by the transmitter/receiver device back onto the latter such that it can be received by the receiver which is integrated in the transmitter/receiver device. Compared to the one-way system, the reflection photoelectric barrier offers the advantage that only one electrical connection is necessary and the reflector by virtue of its special property need only be relatively roughly aligned to the reflection photoelectric barrier.

Reflection photoelectric barriers can be divided into two groups based on their optical structure. In so-called genuine autocollimation systems, separation of the transmitted and received beam is done with a semitransparent mirror or a polarization filter. In the second group of reflection photoelectric barriers, geometrical division of the transmitted and received beam is done by transmission optics and separate receiving optics which is arranged offset to it. The opto-transmitter and opto-receiver are located almost parallel, but at a short distance from one another, in the housing. This reflection photoelectric barrier with transmission optics and second receiving optics is known, for example, from published German Patent Application DE 42 38 116 C2.

It is common to the two above described systems—the one-way system and the reflection system—that the receiver does not receive a light signal or only receives a reduced light signal when there is an object in the area which is to be monitored, since this object completely or at least partially interrupts the beam path of the light which has been emitted by the transmitter. The opto-receiver thus normally—no interruption of the monitored section—detects the light beam which has been emitted by the opto-receiver, and the emitted light pulses.

Basically, different from this manner of operation is the manner of operation of optoelectronic sensing device systems, also called reflection light sensing devices. In these systems, the transmitter and the receiver are likewise located together in a unit. However, in contrast to the reflection photoelectric barrier, there is no reflector as a component of the system. Instead, the light emitted by the transmitter in the transmitter/receiver device is reflected on an object which is to be detected. If at least part of the light which has been reflected by an object is reflected onto the transmitter/receiver device, this reflected portion of light can be detected by the receiver. Reflection light sensing devices are known, for example, from German Patent DE 35 13 671 C3 (and corresponding U.S. Pat. No. 4,782,224), and published German Patent Applications DE 43 11 691 A1 and DE 199 33 439 C2.

As a result of the generally more poorly reflecting surface of the object compared to a reflector, reflection light sensing devices have a shorter range than reflection photoelectric barriers. However, reflection light sensing devices have the advantage that they do not require a second active element like one-way photoelectric barriers and do not require a reflector like reflection photoelectric barriers. Reflection light sensing devices for proximity optoelectronic detection of articles work either as energy V-light sensing devices or as light sensing devices using the triangulation principle.

In an energy V-light sensing device, the emitted light is diffusely reflected on the object which is to be detected. Some of the reflected light is incident on the opto-receiver and initiates a switching process. The two states—reflection or lack of reflection—are evaluated; they are equivalent to the presence or absence of articles in the sensing area. As dictated by the system, the sensing range of the single energy V-light sensing device is therefore highly dependent on the degree of reflection of the object which is to be monitored. The opto-transmitter and opto-receiver can therefore have common transmitting/receiving optics, downstream of the transmitted/receiving optics there being a beam splitter which deflects the light which has been reflected by the object to the receiver.

Triangulation light sensing devices work according to the double lens principle, i.e., the transmitting optics and the receiving optics are separated from one another in space and the transmitted beam and the received beam form an angle to one another. The intersection point of the transmitted beam and the received beam determines the maximum sensing distance of these systems. Due to the relatively minor technical complexity, triangulation light sensing devices using two photodiodes—one for the near area and one for the remote area—are commonly used. The operating distance is determined by the lateral position of the separating line between the two photodiodes.

SUMMARY OF THE INVENTION

This invention relates to an optoelectronic sensor according to the second or third type mentioned above, i.e., a reflection photoelectric barrier or a reflection light sensing device. Within the framework of the invention, detection of an object in a monitored area is defined both as pure ascertainment—object present or not—and also determination of the position of the object, i.e., the distance of the object from the optoelectronic sensor. Transmitting and receiving optics can be formed either of two separate optics, i.e., transmitting optics and separate receiving optics, or of a single optics, which is then both the transmitting and also the receiving optics.

The two types of optoelectronic sensors in which the transmitter device and the receiver device are located in one housing, due to the spatial separation of the transmitted and received beam, each have different disadvantages. Both the use of a semitransparent mirror or beam splitter and also the adjacent arrangement of transmitting optics and receiving optics lead to the fact that the portion of the light which has been reflected by an article or a reflector, and which is incident on the receiver, is reduced. On the one hand, this is because of the relatively high attenuation value of the conventional beam splitter, not only the received signal but also the transmitted signal having to pass the beam splitter, on the other hand, the installation-dictated small size of the lenses for the transmitting optics and the separate receiving optics, by which a relatively small portion of the reflected light is incident on the receiving optics, and thus, is routed to the receiver. Moreover, the beam splitters which are necessary for separation of the transmitted and received beam constitute a considerable cost factor in the production of optoelectronic sensors.

Therefore, a primary object of this invention is to devise the initially described optoelectronic sensor and the initially described process for detection of an object in a monitored area, with which an object can be detected as reliably as possible in a manner that is as simple as possible.

This object is achieved in the initially described optoelectronic sensor in that there is only a single optoelectronic transmitting and receiving component which sequentially acts as the opto-transmitter and the opto-receiver. In accordance with the invention, thus, the spatial separation of the opto-transmitter and the opto-receiver has been replaced by time separation. In this way, first the required components are reduced, since instead of two components, an opto-transmitter and an opto-receiver, only one optoelectronic component is required. In addition, a beam splitter can be eliminated, by which the above described disadvantages in the use of a beam splitter are avoided.

Another advantage which results due to the fact that a separate opto-transmitter and a separate opto-receiver are no longer used, but only a single optoelectronic component, is that the calibration cost which is otherwise necessary in the alignment of the transmitter and receiver is eliminated. By using only a single optoelectronic transmitting and receiving component, the optoelectronic sensor also has preferably only a single transmitting and receiving optics by which the optical transmitted signal is collimated and the optical received signal is guided to the optoelectronic transmitting and receiving component.

The optoelectronic transmitting and receiving component used can basically be a conventional diode. Preferably, the optoelectronic transmitting and receiving component is, however, a laser diode, especially a VCSEL diode (vertical cavity surface emitting laser diode). The advantage of this VCSEL diode is, first of all, that it can also be used as a high speed photodiode. The optical resonator of the VCSEL diode provides not only for the desired narrowband transmitted pulse, but acts at the same time as a very narrowband receiving filter with a center frequency which is automatically coupled to the transmitted frequency. This yields the special advantage of the optoelectronic sensor of the invention that it is extremely immune to outside light. The use of a comparably narrowband filter in front of an opto-receiver can hardly be implemented in a conventional optoelectronic sensor due to the temperature drift of the emission wavelength of the transmitting component.

If the diode is to act as an opto-transmitter, it is operated in the forward direction, while when it is to act as an opto-receiver it is operated in the reverse direction. When the diode is connected with bias in the reverse direction, it can also be used as a high-speed photodiode. This results in the possibility of ascertaining with the optoelectronic sensor of the invention, not only the presence of an object in the monitored area, but also its distance from the optoelectronic sensor. The optoelectronic sensor can also be used as a distance measuring device.

Distance measuring devices are based on the principle that, for a known transit time of a signal through a medium and a propagation speed of the signal known at the same time in this medium, the distance is a product of the propagation speed and the transit time. Due to the extremely high propagation speed of light waves, a high evaluation speed of the optoelectronic sensors used is necessary; this is given by the use of VCSEL diode in blocking operation as an opto-receiver.

According to another advantageous embodiment of the invention which acquires special importance, the very short light transit time pulse which occurs in distance measurement is stretched in time by stroboscopic scanning. At a one meter distance of the object from the optoelectronic sensor, yielding a two meter distance to be traversed by the light beam, the transit time of the light is only 6.67 ns. Stroboscopic scanning stretches this pulse to such an extent that it can be easily processed by an evaluation circuit with a microprocessor. According to one preferred configuration the optoelectronic sensor has a scanner with a storage capacitor and a high-speed switch for this purpose. The switch is controlled by a scanning pulse which is stretched compared to the transmitted pulse.

To produce the scanning pulse, in a first configuration of the optoelectronic sensor, there are a high frequency generator, a low frequency generator and a mixer, the transmitted pulse being derived from the high frequency generator and the scanning pulse being derived from the mixed product of the frequency of the high frequency generator and the frequency of the low frequency generator, which product is produced by the mixer. The low frequency generator thus makes available the low frequency "sweep signal" which is mixed with the signal of the high frequency generator.

According to an alternative embodiment of the optoelectronic sensor, to produce the scanning pulse, in addition to the first high frequency generator, a second high frequency generator and a mixer are provided. The two high frequency generators produce two signals with frequencies which differ only slightly from one another. The mixed product is produced from scanning pulse that is derived a beat that is produced.

The initially described process for detection of an object in a monitored area, with an optoelectronic sensor, is characterized in that the conversion of the electrical transmitted signal into an optical transmitted signal and the conversion of the optical received signal into an electrical received signal take place in succession in time by the same optoelectronic transmitting and receiving component. The process in accordance with the invention is also characterized in that, first of all, instead of spatial separation of the transmitter and receiver or of the transmitted signal and the received signal, time separation is undertaken.

Advantageously, the optical signal path within the optoelectronic sensor for the optical transmitted signal and the optical received signal is identical. The optical transmitted signal and the optical received signal thus traverse the same optical signal path, each in a different direction. Because the optical transmitted signal and the optical received signal traverse the same signal path, the calibration of the transmitting optics and the receiving optics which is located next to it in space, which calibration is otherwise necessary in the prior art, and the adjustment of a beam splitter are eliminated.

The process of the invention is also advantageously used for determining the distance of an object in the monitored area so that a pulsed transmitted signal is used and the transit time of the optical signal is measured and the distance of the object is determined from it. As was already described above in conjunction with the optoelectronic sensor in accordance with the invention, in the process of the invention, the electrical received signal is advantageously stroboscopically scanned, and in this way, stretched in time. In doing so, the electrical received signal is scanned for a short time interval, the scanning instant being shifted continuously between successive periods of the transmitted pulse. The sequencing control for producing the scanning pulse can work essentially in analog fashion or essentially digitally.

In particular, there are a host of possibilities for embodying and developing the optoelectronic sensor and the process according to the invention for detection of an object. In this regard reference is made to the following description of preferred embodiments in conjunction with the accompanying drawings.

DETAILED DESCRIPTION OF THE INVENTION

Figure 1A:
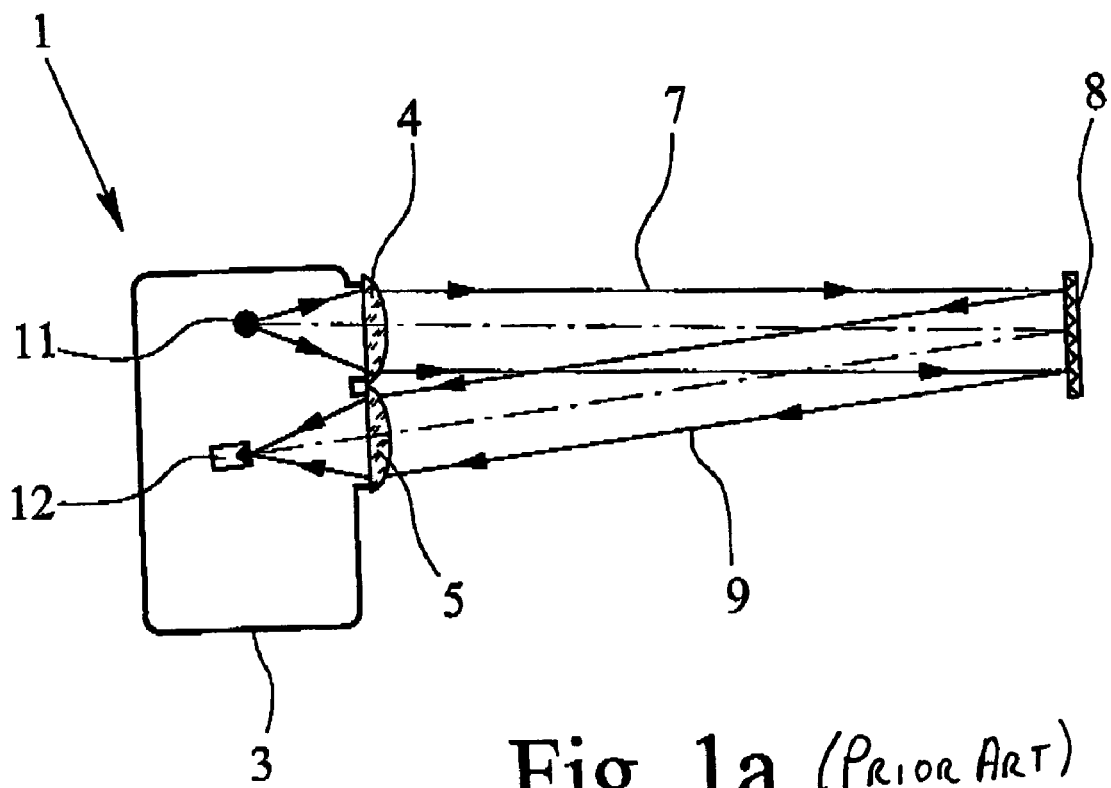
FIG. 1 is a simplified representation of the optoelectronic sensor according to the prior art.
Figure 1B:
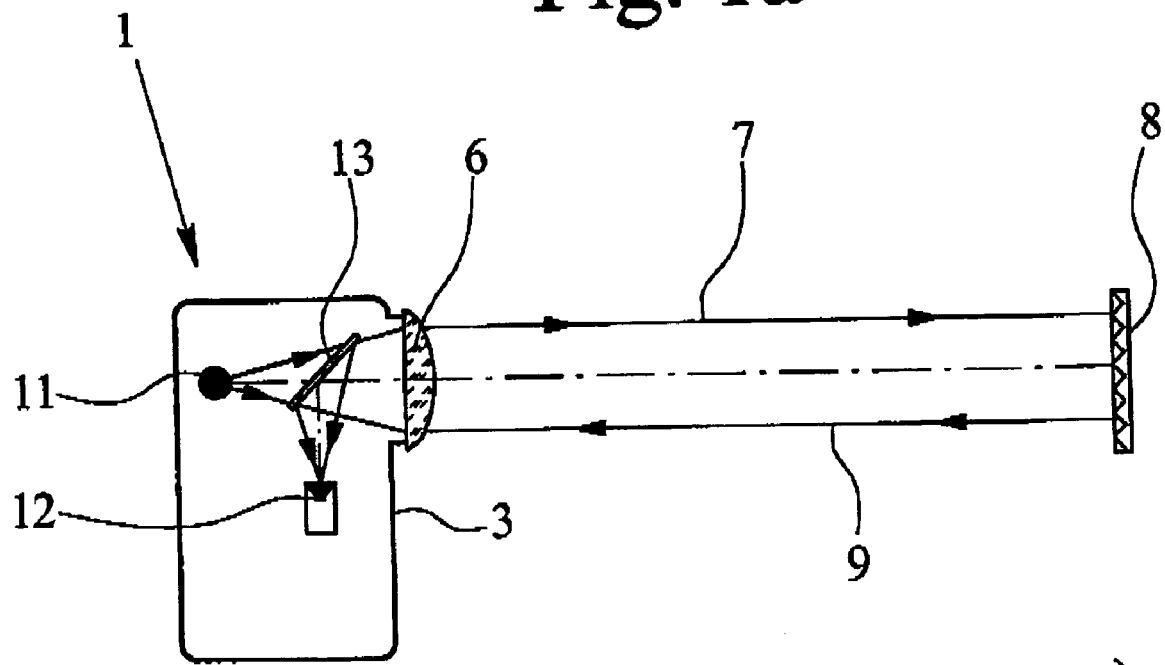
Figure 2:
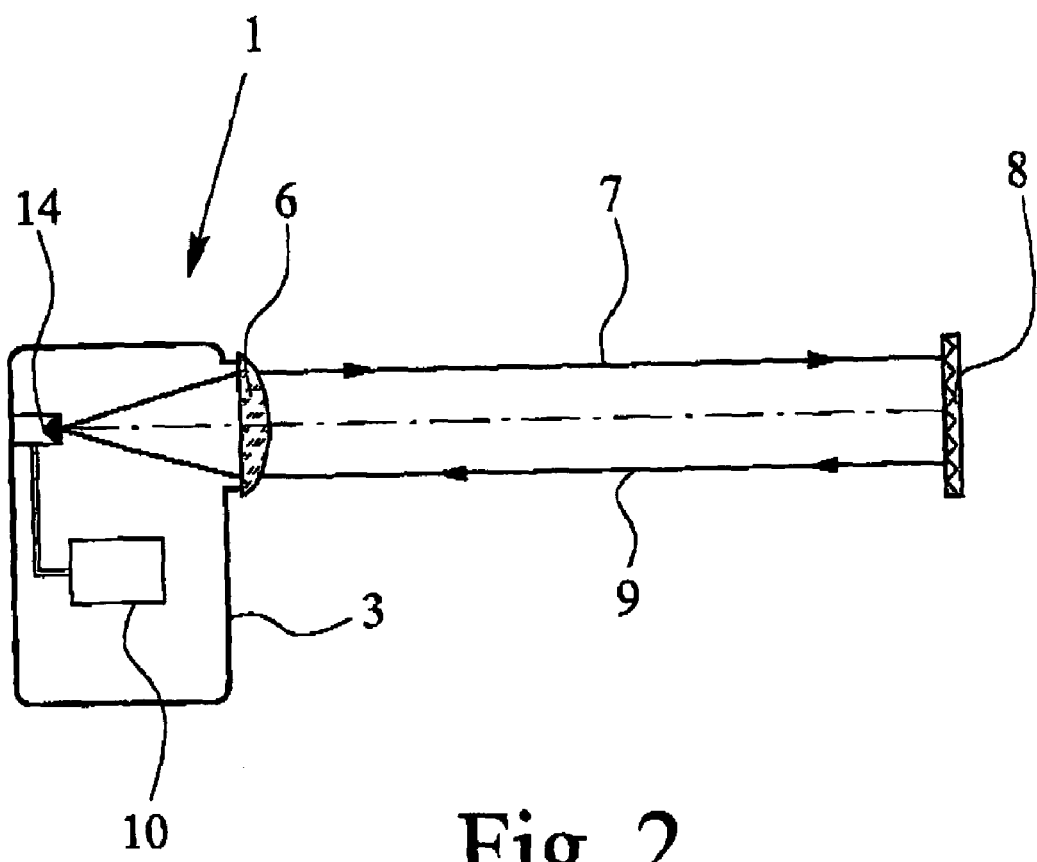
FIG. 2 is a simplified representation of a first embodiment of an optoelectronic sensor in accordance with the invention.
Figure 3:
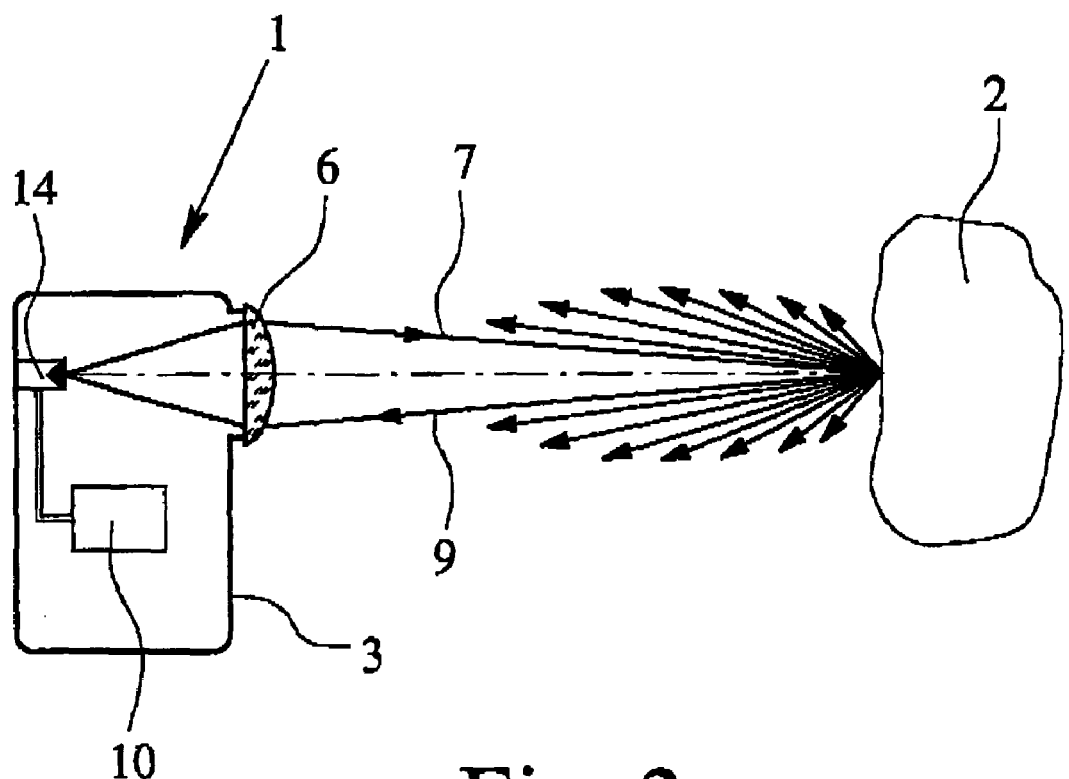
FIG. 3 is a simplified representation of a second embodiment of an optoelectronic sensor of the invention and FIG. 4 shows a highly simplified circuit diagram of an optoelectronic sensor according to the invention.

FIG. 1 shows two embodiments of a known optoelectronic sensor 1, specifically a reflection photoelectric barrier, for detection of an object 2—shown only in FIG. 3—in a monitored area. The optoelectronic sensor 1 shown in FIG. 1a has a housing 3 with transmitting optics 4 and separate receiving optics 5. In contrast, the optoelectronic sensor 1 as shown in FIG. 1b has only one transmitting and receiving optics 6 by which both the transmitted beam 7 emerges from the housing and also the received beam 9 which has been reflected on the reflector 8 again enters the housing 3. In addition, both the known optoelectronic sensors 1 shown in FIG. 1 and also the optoelectronic sensors 1 of the invention which are shown in FIGS. 2 and 3 have an evaluation circuit 10 which is shown only schematically in FIGS. 2 and 3. It is common to the optoelectronic sensors 1 shown in FIG. 1 that they each have one opto-transmitter 11 for producing the transmitted beam 7 and a separate opto-receiver 12 for receiving the reflected received beam 9.

The two reflection photoelectric barriers shown in FIGS. 1a and 1b differ in that in the reflection photoelectric barrier shown in FIG. 1a geometrical division of the transmitted beam 7 and the received beam 9 takes place by the separate arrangement of the transmitting optics 4 and the receiving optics 5. The transmitted beam 7 which has been produced by the opto-transmitter 11 is guided by the transmitting optics 4 to the reflector 8. As a result of the geometrical offset within the reflector 8 and the small angular error in back reflection, the incident radiation is reflected back in a more or less large solid angle. Therefore, the received beam 9 which runs at an angle to the transmitted beam 7 travels to the receiving optics 5 which is located next to the transmitting optics 4 and by which the received beam 9 is focused onto the opto-receiver 12.

The known reflection photoelectric barrier which is shown in FIG. 1b differs, first of all, from the reflection photoelectric barrier as shown in FIG. 1a in that it has simply one transmitting and receiving optics 6. In this reflection photoelectric barrier which operates according to the autocollimation principle, the transmitted beam 7 and the received beam 9 are separated by a semitransparent mirror 13 which is also called a beam splitter. The transmitted beam 7 which is produced by the opto-transmitter 11 is incident on the semitransparent mirror 13 which partially passes the transmitted beam 7. This portion is guided by the transmitting and receiving optics 6 to the reflector 8, by which the radiation as the received beam 9 is reflected back to the transmitting and receiving optics 6. The received beam 9 passes through the transmitting and receiving optics 6 and is then incident on the mirror 13 on which part of the received beam 9 is reflected to the opto-receiver 12. The advantage of the optoelectronic sensor 1 which is shown in FIG. 1b and in which by using only a single transmitting and receiving optics 6 calibration of the transmitting optics 4 and the receiving optics 5 is abandoned and optics with a greater diameter can be used, is bought however at the cost of the light losses which are caused by the semitransparent mirror 13.

The optoelectronic sensors 1 of the invention which are shown in FIGS. 2 and 3 differ, first of all, from the known optoelectronic sensors 1 in that, instead of a separate opto-transmitter 11 and a separate opto-receiver 12, only a single optoelectronic transmitting and receiving component 14 is used. The spatial separation of the opto-transmitter 11 and the opto-receiver 12 which is conventional in the prior art is replaced by time separation, i.e., the optoelectronic transmitting and receiving component 14 acts in time succession as an opto-transmitter and as an opto-receiver.

In particular, a VCSEL diode 15 is suited as the transmitting and receiving component 14; due to its optical resonator, it emits not only a very narrowband transmitted beam 7, but due to the resonator which acts as a narrowband optical filter in reception also detects only a very narrowband received beam 9. This has the advantage that the optoelectronic sensor 1 is highly immune to noise, by which scattered light is prevented from influencing the measurement result. Moreover, the VCSEL diode 15 can also be used as a very high-speed photodiode.

The optoelectronic sensors 1 in accordance with the invention which are shown in FIGS. 2 and 3 differ in that, in FIG. 2, a reflection photoelectric barrier with a reflector 8 is shown, while FIG. 3 shows a reflection light sensing device in which the transmitted beam 7 is diffusely reflected back from the object 2 which is to be detected. The optoelectronic sensor 1 of the invention can thus be used both as a reflection photoelectric barrier with a reflector 8 and also as a reflection sensing device without a reflector. To achieve sufficient range, the transmitted power of the VCSEL diode 15 can simply be increased.

In the optoelectronic sensor 1 of the invention, the transmitting and receiving component 14, which acts as an opto-transmitter, produces a transmitted beam 7 which is guided to the reflector 8 (FIG. 2) or an object 2 (FIG. 3) by the transmitting and receiving optics 6. The received beam 9 which has been reflected on the reflector 8 or on the object 2 is again incident on the transmitting and receiving optics 6, from which it is guided to the transmitting and receiving component 14 which is acting at this point as an opto-receiver. By using only one transmitting and receiving optics 6, its diameter can be increased, without increasing the dimensions of the housing 3, compared to the diameter of the receiving optics 5 for an optoelectronic sensor 1 with transmitting optics 4 and separate receiving optics 5, as shown in FIG. 1a.

Figure 4:
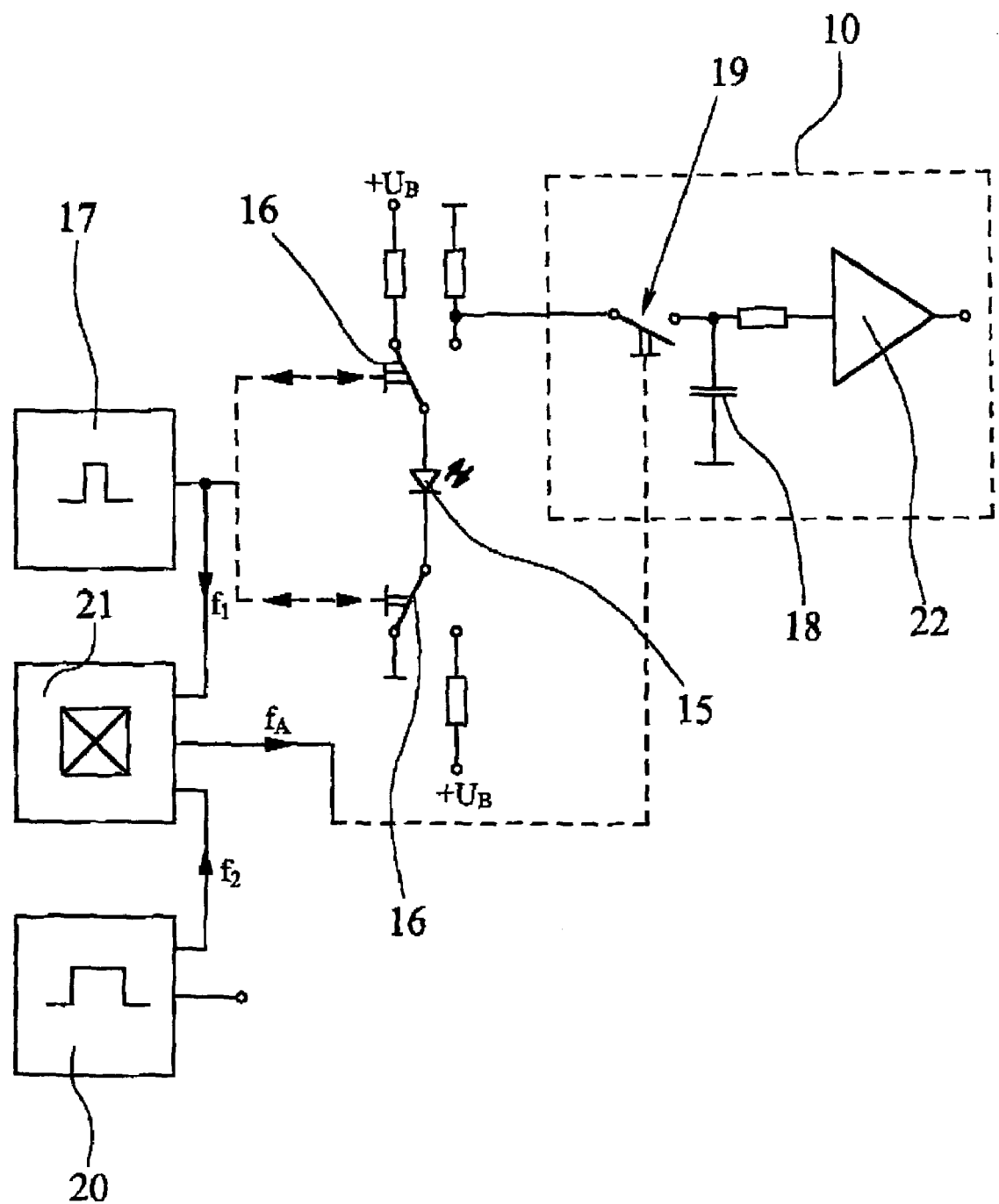

FIG. 4 shows a highly simplified circuit diagram of the optoelectronic sensor 1 which is also used to explain the process in accordance with the invention. Preferably, with the optoelectronic sensor 1 according to the invention, not only the presence or the absence of an object 2 is ascertained in a monitored area, but also the distance of the object 2 from the optoelectronic sensor 1 is also determined, for which the optoelectronic sensor 1 works according to the light transit time principle.

To do this, the VCSEL diode 15 which is used as a transmitting and receiving component emits very short optical transmitted pulses with a pulse width of about only 1 ns. To switch the VCSEL diode 15 from transmitting operation into receiving operation, there is a bridge switch 16 with which the polarity of the VCSEL diode 15, which is operated in the forward direction in transmitting operation, is reversed. A high frequency generator 17 is used both to produce the electrical transmitted pulse and also to control the bridge switch 16. The bridge switch 16 can be, for example, four monoflops which are wired to one another in a bridge circuit.

The light transit time pulse which is very short as a result of the very high propagation speed of light is stretched in time by stroboscopic scanning. To do this, in the evaluation circuit 10 of the optoelectronic sensor 1, there is a scanner which has a storage capacitor 18 and a high-speed switch 19. The electrical received signal is scanned for a very short time interval and the scanning instant is continuously shifted between successive periods of the electrical transmitted pulse. In this way, the processing of the very short light transit time pulse is lengthened in time so dramatically that it can be easily evaluated with a microprocessor and parasitic transit times of the evaluation circuit 10, i.e., the electronics, no longer have any importance.

To produce the scanning pulse, there are a low frequency generator 20 and a mixer 21, the scanning frequency $f_A$ of the scanning pulse resulting from the sum of the frequency $f_1$ of the high frequency generator 17 and the frequency $f_2$ of the low frequency generator 20. The switch 19 can be controlled by a scanning bridge comprised of four monoflops; this has the advantage that, in this way, the pulse width of the scanning pulse can be shortened to the magnitude of the pulse width of the transmitted pulse. The time stretching factor of stroboscopic scanning is this case is the quotient of the frequency $f_1$ to the frequency $f_2$ so that for a high frequency signal of, for example, $f_1=1$ MHz and a low frequency signal of, for example, $f_2=1$ kHz, a time stretching factor of 1000 is reached.

Instead of the analog sequencing control which is schematically shown by FIG. 4, digital sequencing control can also be implemented, in which, then, the scanning pulse is produced from the superposition of the high transmitted frequency $f_1$ with a second high frequency $f_i$. The two frequencies $f_1$ and $f_i$ have only a very small frequency difference, the time stretching factor then resulting from the ratio of the high transmitted frequency $f_1$ to the difference frequency $(f_1-f_i)$. Here, two crystal-stable high frequency oscillators can be used, in which the frequency difference is produced using PLL frequency analysis in which each nth pulse is suppressed.

The evaluation circuit 10 has an amplifier 22, and preferably, a microcontroller so that, then, with the optoelectronic sensor 1, a fundamentally known learning process can be carried out in which, for example, reflections from a background or a transparent object can be taught, stored and taken into account in a subsequent measurement.

What is claimed is:

1. Optoelectronic sensor for detection of an object in a monitored area, comprising:
    a housing with transmitting and receiving optics and with an evaluation circuit, and
    a single optoelectronic transmitting and receiving component that is adapted to temporally successively operate as an opto-transmitter that emits an optical transmitted signal into the monitored area and as an opto-receiver that receives an optical return signal reflected back from a reflector or object in the monitored area that is in a path of the signal to the reflector.

2. Optoelectronic sensor as claimed in claim 1, wherein only one transmitting and receiving optics with at least one lens is provided.

3. Optoelectronic sensor as claimed in claim 1, wherein the optoelectronic transmitting and receiving component is a diode.

4. Optoelectronic sensor as claimed in claim 3, wherein the diode is wired as an opto-transmitter in a forward direction and as an opto-receiver in a reverse direction.

5. Optoelectronic sensor as claimed in claim 4, wherein the diode is switchable from transmitting operation into receiving operation via at least one bridge switch, the bridge switch being controlled by a high frequency generator.

6. Optoelectronic sensor as claimed in claim 1, wherein the evaluation circuit has a scanner with a storage capacitor and a switch.

7. Optoelectronic sensor as claimed in claim 6, wherein the switch is controlled by a time-stretched scanning pulse.

8. Optoelectronic sensor as claimed in claim 7, further comprising a high frequency generator, a low frequency generator and a mixer, and wherein a transmitted pulse is derived from the high frequency generator and wherein mixer is adapted to produce a mixed product of a frequency $f_1$ of the high frequency generator and a frequency $f_2$ of the low frequency generator, from which is derived the scanning pulse.

9. Optoelectronic sensor as claimed in claim 7, further comprising a first high frequency generator, a second high frequency generator and a mixer and wherein the scanning pulse is produced from superposition of a high transmitted frequency $f_1$ of the first high frequency generator with a second high frequency $f_i$ of the second high frequency generator by the mixer.

10. Optoelectronic sensor as claimed in claim 1, wherein the sensor is a reflection photoelectric barrier sensor.

11. Optoelectronic sensor as claimed in claim 1, wherein the sensor is a reflection light sensing device.

12. Optoelectronic sensor as claimed in claim 3, wherein the diode is a laser diode.

13. Optoelectronic sensor as claimed in claim 3, wherein the laser diode is a VCSEL diode.

14. Process for detection of an object in a monitored area, with an optoelectronic sensor, comprising the steps of:
converting an electrical transmitted signal into an optical transmitted signal,
emitting the optical transmitted signal into the monitored area,
reflecting back the optical transmitted signal from a reflector or obiect in the monitored area that is in a path of the signal to the reflector as an optical return signal at least in part to an optoelectronic sensor, and
converting the optical return signal into an electrical received signal,
wherein conversion of the electrical transmitted signal into an optical transmitted signal and the conversion of the optical return signal into the electrical received signal are performed temporally successively by a single optoelectronic transmitting and receiving component.

15. Process as claimed in claim 14, wherein an optical signal path within the optoelectronic sensor for the optical transmitted signal is the same as an optical signal path for the optical return signal, except that the optical transmitted signal and the optical received signal traverse the same optical signal path in different directions.

16. Process as claimed in claim 14, wherein the electrical transmitted signal is pulse-shaped, wherein a transit time of the optical signal is measured and a distance of the object is detennined from the transit time measured.

17. Process as claimed in claim 16, wherein the electrical received signal is stroboscopically scanned so as to be stretched in time.

18. Process as claimed in claim 17, wherein the electrical received signal is scanned for a short time interval and a scanning instant shifted continuously between successive periods of the transmitted pulse.

19. Process as claimed in claim 18, wherein a scanning frequency $f_A$ is produced by mixing a high transmitted frequency $f_1$ with a lower frequency $f_2$.

20. Process as claimed in claim 19, wherein the transmitted frequency $f_1$ is in a range from of a few 100 kHz to a few MHz and the second lower frequency $f_2$ is in a range from a few 100 Hz to a few kHz.

21. Process as claimed in claim 18, wherein a scanning frequency $f_A$ is produced by mixing a high transmitted frequency $f_1$ with a second high frequency $f_3$.

22. Process as claimed, in claim 19, wherein the transmitted frequency $f_1$ and the second frequency $f_2$ are in the range from a few 100 kHz to a few MHz.

23. Process as claimed in claim 19, wherein the scanning frequency $f_A$ is processed by an evaluation circuit.

24. Process as claimed in claim 23, wherein the electrical transmitted signal has a pulse width of roughly 1 ns.

25. Process as claimed in claim 16, wherein the sensor has an evaluation unit which has a microcontroller, and wherein a learning process is canied out via the microcontroller.

* * * * *